March 13, 1956 — H. M. GALLAY ET AL — 2,737,874
AIRCRAFT HEATING, VENTILATING AND ANTI-ICING SYSTEM
Filed Sept. 19, 1950 — 3 Sheets-Sheet 1
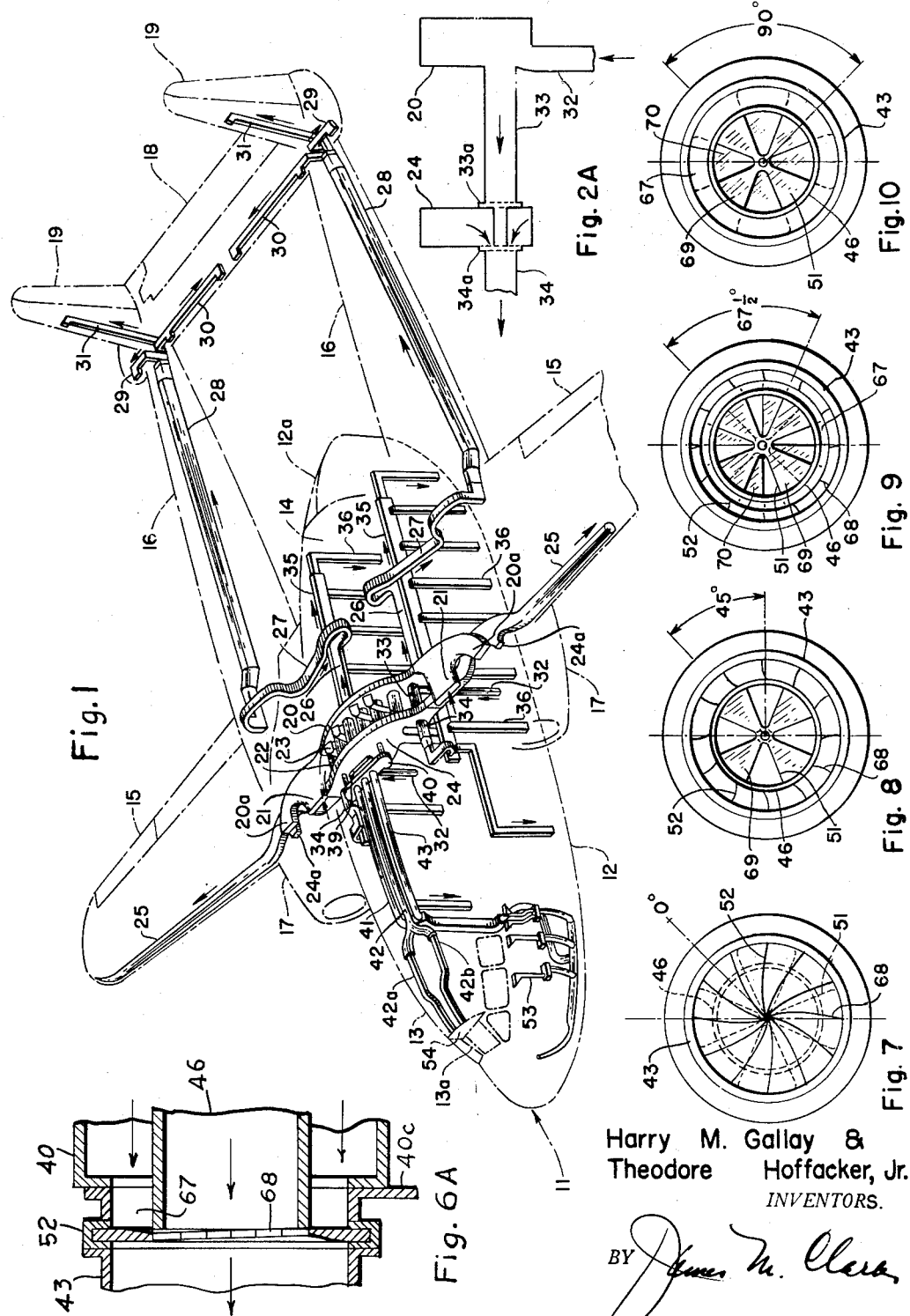
Harry M. Gallay &
Theodore Hoffacker, Jr.
*INVENTORS.*
THEIR PATENT ATTORNEY.

March 13, 1956  H. M. GALLAY ET AL  2,737,874
AIRCRAFT HEATING, VENTILATING AND ANTI-ICING SYSTEM
Filed Sept. 19, 1950  3 Sheets-Sheet 2
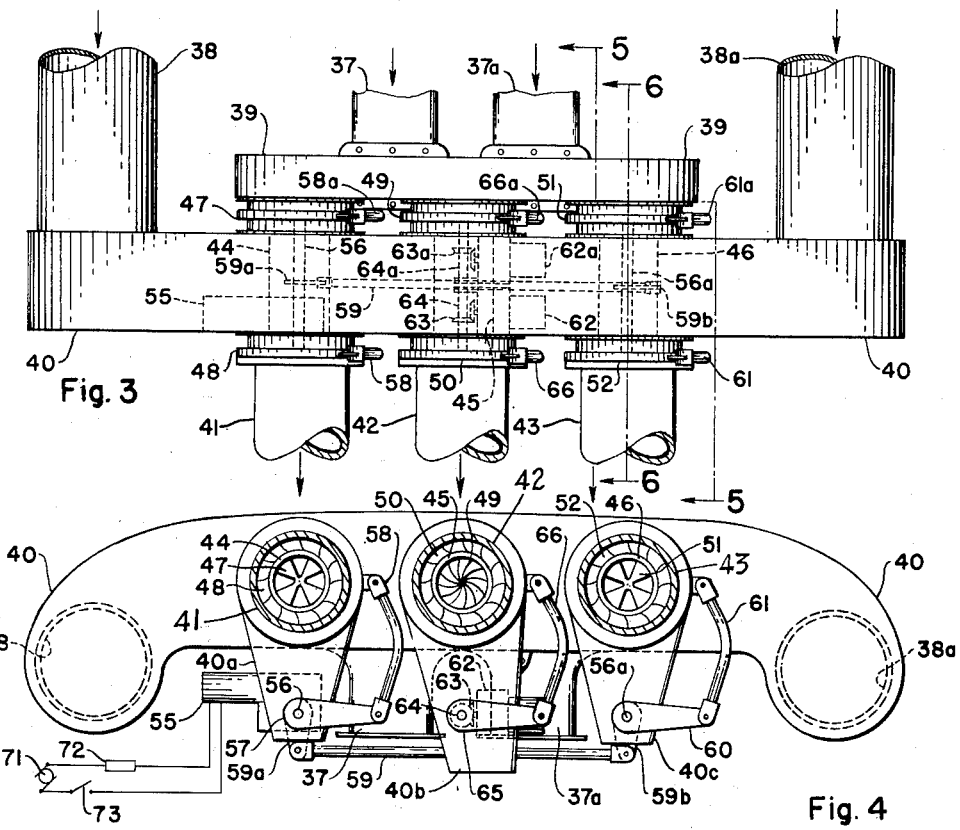
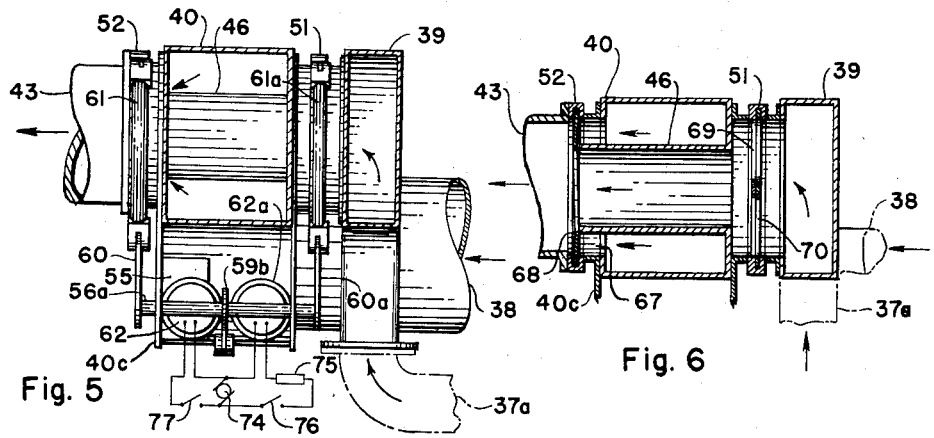
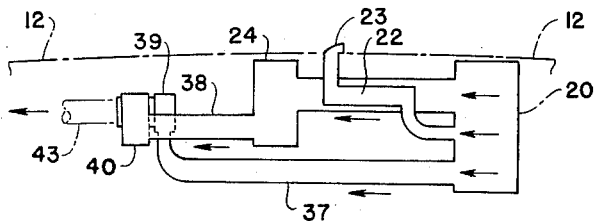
Harry M. Gallay &
Theodore Hoffacker, Jr.
*INVENTORS.*
BY James M. Clark
THEIR PATENT ATTORNEY.

Harry M. Gallay &
Theodore Hoffacker, Jr.
INVENTORS.

BY James M. Clark

THEIR PATENT ATTORNEY.

United States Patent Office 2,737,874
Patented Mar. 13, 1956

2,737,874

AIRCRAFT HEATING, VENTILATING, AND ANTI-ICING SYSTEM

Harry M. Gallay, Middletown, Del., and Theodore Hoffacker, Jr., Hagerstown, Md., assignors to Fairchild Engine and Airplane Corporation, a corporation of Maryland Application September 19, 1950, Serial No. 185,674

13 Claims. (Cl. 98—38)

The present invention relates generally to heating and ventilating arrangements and more particularly to improvements in such heating, ventilating and anti-icing systems and their component parts as applied to aircraft and like vehicles.

In the operation of modern high-speed aircraft, extreme variations in temperature and other climatic conditions are frequently met with during relatively short periods of time. Such extreme variations may be due to differences in altitude within the same general region, or to flights over relatively great distances from cold to hot regions, or vice versa, or they are frequently caused to a somewhat lesser extent by differences in day and night temperatures to which an aircraft may be subjected while at rest upon the ground at a given location. It is, of course, desirable to maintain comfortable temperatures within the compartment occupied by the pilot and other operating personnel of such aircraft and where passengers are carried by the airplane, or where perishable cargoes susceptible to temperature changes are carried, it is also desirable to heat and ventilate the respective compartment to also maintain comfortable conditions for the occupants or proper conditions for protection of the cargo. Under certain flight conditions at critical temperatures, ice is likely to form on the exterior surfaces of the aircraft, particularly upon the leading edges, and it is also desirable to provide anti-icing, or de-icing, means which are suitably controlled to prevent or remove such dangerous ice accumulations. The present invention is directed to an improved heating, ventilating and anti-icing system for accomplishing all of these results and embodies certain novel arrangements and relationships of its component parts which contribute materially to its flexibility of control and efficiency of operation for the intended purposes. Among the more important of these improvements is the novel means for mixing hot and cold air from separate sources in any desired proportions to utilize the mixed warm air in a heating and ventilating system.

It is, accordingly, a primary object of the present invention to provide an improved heating, ventilating and anti-icing system for aircraft. It is a further object to provide such as system with control means whereby certain compartments of the aircraft may be heated or ventilated as may be found desirable and the leading edges of the surfaces controllably heated to prevent the accumulation of ice thereon. It is a further object of the present invention to provide such a system having a novel interrelationship of its respective components to thereby contribute to greater flexibility and efficiency of operation. It is a still further objective to provide an improved and efficient means for mixing or tempering hot and cold air, or other fluids, or providing the desired amounts and temperatures of air or other fluid for the intended heating, ventilating or anti-icing purposes.

It is a corollary objective of the present invention to provide mixed warm air in a range extending from a maximum amount of cold air without the admixture of hot air, to a condition in which no cold air is mixed with a definite maximum amount of hot air. In other words, the range extends from all cold air without any hot air admixture, through an extensive intermediate range of mixtures of both cold and hot air in varying proportions, to the opposite condition wherein there is absolutely no cold air and all of the air flowing is entirely hot air. Similarly it is also an object to provide cold air only, varying from none at all up to a definite maximum, and a further object resides in the provision of means for shutting off both the hot and cold, or mixed air flows, completely.

Other objects and advantages of the present invention will occur to those skilled in the art after reading the following description, taken in conjunction with the accompanying drawings, forming a part hereof, in which:

Fig. 1 is a perspective view of an airplane to which the improved heating, ventilating and anti-icing system has been applied;

Fig. 2 is a diagrammatic side elevational view of the main transverse air ducts, heater units and mixing chambers of the system shown in Fig. 1;

Fig. 2A is a further diagrammatic showing of the air mixing arrangement for the load compartment air;

Fig. 3 is a plan view of the mixing units for the heating and ventilating air to the crew compartment and windshield de-icing facilities;

Fig. 4 is a front elevational view of the same;

Fig. 5 is a transverse sectional view of one of the mixing valve units as taken along the lines 5—5 of Fig. 3;

Fig. 6 is a similar sectional view of the same mixing valve unit as taken along the lines 6—6 of Fig. 3;

Fig. 6A is a view of a portion of Fig. 6 showing the mixing valve on a larger scale.

Figure 11:
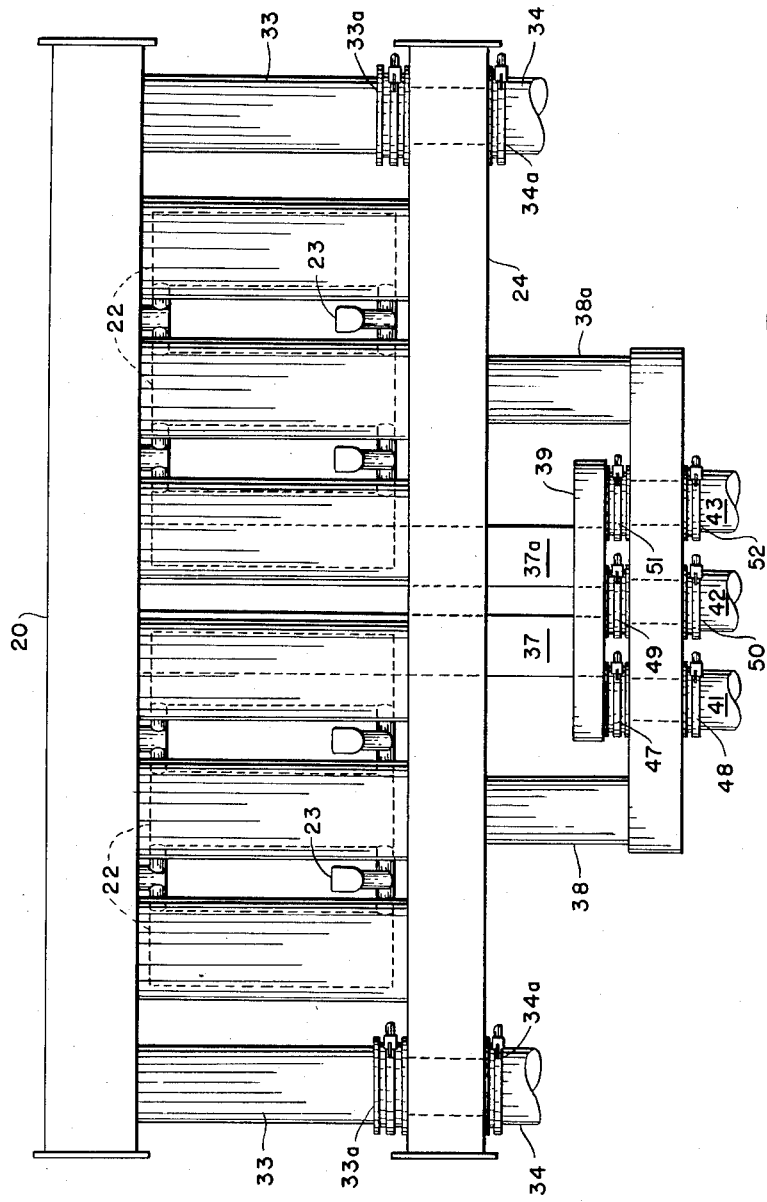

Figs. 7 to 10, inclusive, are front elevational views of one of the sets of the mixing valves in several of its adjusted positions illustrating the various proportions of mixing; and Fig. 11 is a plan view of the main transverse air ducts, heater units, and mixing chambers of the system shown in Figs. 1 and 2.

Referring now to Fig. 1, the numeral 11 indicates the outline of an aircraft having a fuselage or load-carrying portion 12 provided with loading doors 12a at its aft portion, the fuselage being provided with a forward pilot cabin or crew compartment 13 having a windshield portion 13a, as well as a load or cargo compartment 14 provided within its aft portion. The fuselage 12 is supported in flight by the sustaining wings 15, from which extend rearwardly the empennage supporting booms 16, forward of which are positioned the nacelles 17 for the power plants of the airplane. The empennage comprises a horizontal tail surface 18, interconnecting the trailing portions of the boom 16, as well as a pair of twin rudder surfaces 19.

The cold or fresh air duct is indicated at 20 extending transversely across the fuselage 12, beneath its deck or roof portion, being arcuately curved and of generally vertical rectangular cross-section. During flight rammed cold air enters the duct 20 through the fresh air inlets 21 adjacent the leading edges of each wing in the region of the nacelles 17. The outboard portions of the fresh air duct 20 extending beyond the sides of the fuselage within the wings are relatively flat horizontal portions of rectangular cross-section and they terminate outwardly in the branch portions 20a which are utilized as air feed conduits to the carburetors of the power plants. A plurality of internal combustion type air heaters 22 are longitudinally disposed and extend from the cold air duct 20 to the hot air duct 24. The heaters 22 are provided with suitable clam-shell type eductor outlets 23 by which the products of combustion are exhausted into the airstream along the top surface of the fuselage. These eductor elements 23 are also shown diagrammatically in Fig. 2, in which it will be noted that the fresh air initially flows forward from the fresh or cold air duct 20, across the heaters 22, directly into the hot air duct 24, and a portion of the fresh air from the duct 20 passes directly through the heaters 22 as combustion air, and is subsequently exhausted through the eductor elements 23.

A further large volume of cold air flows forward from the duct 20 through the cold air by-passes 37 and 37a where it is mixed with the hot air flowing forward through the ducts 38 and 38a, by an improved mixing arrangement to be hereafter more fully described. As in the case of the cold air duct 20, the hot air duct 24 is also flattened and is gradually reduced in cross-section as it extends laterally and outwardly into the wings, being provided with engine pre-heat ducts 24a within each engine nacelle 17, and extend through the tubular leading edge de-icing duct portions 25 within each wing 15. A pair of longitudinally extending hot air ducts 26 are also in communication with the transverse hot air duct 24, extending aft along the ceiling and adjacent the sides of the cargo compartment 14, branching upwardly and outwardly through the branch conduits 27, and thence rearwardly through the ducts 28 disposed within each of the booms 16 for the de-icing of the tail surfaces. At the aft end of the hot air ducts 28 within the booms, they branch into the horizontal ducts 29 and 30 for the de-icing of the leading edges of the horizontal tail surfaces, and into the vertically extending ducts 31 for de-icing the leading edges of the vertical stabilizer surfaces.

When the aircraft is at rest upon the ground and it is necessary to provide heated air, or to ventilate the airplane, the air is drawn into the system from within the cargo compartment 14 through the vertical "ground" air ducts 32, which are open at their lower ends and extend upwardly to the suction side of suitable blowers (not shown) which are provided with check valves which prevent back flow of air through the ram air scoop 21 when the blower is operating. Similarly the blower is cut off when the aircraft is in flight and the fresh air is drawn through the rammed air inlet 21. The heated air for the cargo compartment 14 is provided, as shown in both Figs. 1 and 2A, by mixing the cold air flowing forward from the cold air duct 20 through the duct 33 and the "Star" valve 33a, into the mixing chamber arrangement within the hot air duct 24, from which the flow is controlled by the "Iris" valve 34a. The properly blended or tempered air, comprising the mixture of hot and cold air, flows forward into the duct 34 from which it branches and extends through the horizontal header 35 into each of the vertical branch ducts 36.

The mixing chamber arrangement of the valves 33a and 34a at the hot air duct 24 will be explained below in connection with the similar mixing valve arrangements provided at the transverse hot air plenum chamber 40 for the provision of heated air to the cabin 13 through the forwardly extending ducts 41 and 43, and the outlets 53, as well as through the duct 42 and its branches 42a and 42b to the windshield de-frost outlets 54 adjacent the windshield 13a. The mixing valve arrangements for these outlets, is more particularly shown in Figs. 1 and 2, and is supplemented by the details in the remaining figures. It will be noted from the diagrammatic showing of Fig. 2 that the heated air for the forwardly extending duct 43 is obtained by mixing cold air drawn through the cold air by-passes 37 and 37a from the cold air duct 20, with hot air flowing forward through the ducts 38 and 38a from the hot air duct 24 to the hot air plenum chamber 40 on each face of which suitable mixing valves shown in detail in Figs. 3 to 10, inclusive, are provided, the cold air being distributed to these valves from the cold air by-pass ducts 37 and 37a through the transverse cold air plenum chamber 39.

Referring now to Figs. 3 and 4, it will be noted that valves 47, 49 and 51 are disposed between the cold air plenum 39 and the hot air plenum 40, and that the cold air passing through the valves 47, 49 and 51 is carried forwardly through the hot air plenum 40 by means of the cold air cross ducts 44, 45 and 46, respectively. These cross ducts are axially aligned with the heated air ducts 41, 42 and 43 and are centrally disposed within the annular inlets to the ducts 41, 42 and 43 from the hot air plenum 40. The valves 47 and 51 are of the "Star" type and the valves 48, 49, 50 and 52 are each of the "Iris" type. The cold air flow from the cross duct 44 into the duct 41, as well as the external hot air flow from the plenum 40 into the duct 41 through the annular space around the duct 44 are both controlled by the "Iris" valve 48, and the hot air flows into the ducts 42 and 43 are similarly controlled by the "Iris" valves 50 and 52, respectively.

Each of the "Star" valves referred to is preferably of the type which consists of two adjacent circular discs, one of which is fixed to the valve casing and the other rotates about a pivot disposed at the axial center of the valve. Each of the discs are provided with segmental shaped openings, as may be more clearly seen in Figs. 8, 9 and 10, such that it is possible with the movable disc rotated through an angle of 45° in either direction from its centrally open position in which the openings coincide, to close the opening off completely at the end of such angular rotation, and any intermediate or partial rotation of the movable disc will have the effect of restricting the flow partially or approximately in proportion to the angular rotation. The cold air valves 47 and 51 are both of the "Star" type and are mechanically actuated such that from their initially closed position they attain a full open condition in 45° of angular rotation, beyond which they gradually close and at 90° are again fully closed.

The front valves 48, 50 and 52, as well as the central rear valve 49 are each of the "Iris" type, the construction being similar to that of a "Compur" or compound camera shutter or the stop mechanism for a lens wherein interconnected pivoted leaves are moved from a substantially circular opening of a definite maximum size to circular openings of reduced size, or completely closed, and vice versa, by a lever connected to the shutter or stop leaves. The "Iris" valve is accordingly a variable-diameter valve of the circular opening type in which the opening, whenever the valve is partially or fully open is substantially axially located and circularly formed as distinguished from the "Star" type valve in which the openings are either radial slits or segments which vary in width depending upon the position to which the valve has been opened.

The three sets of mixing valves, namely, numbers 47—48, 49—50 and 51—52 are power-driven and thermostatically controlled. It will be recalled that the mixing valve units 47—48 and 51—52 each comprise a "Star" valve and an "Iris" valve, and control the flow and temperature of the heated air into the ducts 41 and 43 for the crew compartment, and the remaining valve set namely, 49—50 is comprised of two "Iris" valves controlling the flow and temperature of the heated air passing through the duct 42 for the windshield defrosting outlets 54. The mixing valves for the crew compartment heated air ducts are driven by the reversible electric motor 55 having a slow speed shaft 56, which is attached to the cranks 57 and 59a, the former being connected to the push-pull rod or link 58 for the actuation of the "Iris" valve 47, and the crank 59a being attached to the push-pull link 58a for the actuation of the "Star" valve 47. The motor-driven crank 59a is pivotally connected to the horizontal push-rod 59, which is pivotally connected to the secondary shaft 56a by the crank 59b, and connected with the "Iris" valve 52 by the crank arm 60 and push rod 61. Similarly the "Star" valve 51 is pivotally connected with the drive shaft 56a by push rods 61a.

The drive mechanism is supported from the hot air plenum chamber 40 by means of the drive supporting structures 40a, 40b and 40c as shown in Figs. 3, 4 and 5. The motor 55 receives electrical energy from the generator or other power source 71 as controlled by the thermostat 72 and the switch 73. The mixing valve unit comprising the two "Iris" valves 49 and 50 is arranged such that each of these "Iris" valves is separately driven by the reversible electric motors 62a and 62, respectively, the motor 62a driving the cold air "Iris" valve 49, and the motor 62 driving the hot air "Iris" valve 50. The motor 62 drives the beveled gear set 63, which in turn drives the actuating shaft 64, to which the lever 65 and the push-pull rod 66 are interconnected for rotary actuation of the hot air "Iris" valve 50. Similarly, the motor 62a drives the beveled gear set 63a, which in turn drives the rear shaft 64a, and the cold air "Iris" valve 49 is similarly actuated by the push-pull rod 66a. The motors 62 and 62a are energized from the power source 74 as shown in the wiring diagram in Fig. 5, being controlled by the separate switches 76 and 77, with a thermostatic control 75 in the circuit for the motor 62a for the cold air valve only. It will be understood that each of the electric motors 55, 62 and 62a are of the gear reduction type in which their output drive shafts run at a relatively slow speed at which the moving elements of the respective valves are actuated.

Reference to Figs. 7 to 10 inclusive will assist in an understanding of the manner in which the valves in one of the mixing units operate. The valves shown in these figures are the cold air "Star" valve 51 and the hot air "Iris" valve 52 between which extends the cold air cross duct or nozzle portion 46, as more particularly shown in the cross sections in Figs. 5 and 6. The initially closed condition of each of the valves 51 and 52 is indicated in the zero degree position in Fig. 7, in which it will be noted that the individual leaves 68 of the "Iris" valve are closed completely, as are also the openings in the fixed segments of the "Star" valve 51. As the motor 55 now actuates both the cold air "Star" valve 51 and the hot air "Iris" valve 52 in the same direction through the push-pull links 61a and 61, respectively, the segmental openings in the fixed part 69 of the "Star" valve 51 are opened as the movable portion 70 of the "Star" valve rotates, and at the same time the leaves 68 of the "Iris" valve gradually open at their center with an aperture of increasing diameter. After the push-pull links have rotated each of the valves through 45°, the valves will attain the positions shown in Fig. 8 in which the "Star" valve 51 is fully opened and the "Iris" valve 52 has opened only to the diameter of the cross duct or nozzle 46. Accordingly, in the position of the valves shown in Fig. 8 the full cold air flow condition has been reached by the fully opened position of the "Star" valve 51, but the "Iris" valve 52 in opening only to the diameter of the cross duct 46, permits the full flow of the cold air therethrough but as yet does not permit any of the hot air to flow from the hot air plenum chamber 40 around the exterior of the cross duct 46 or through the annular opening 67, which is still closed by the partially opened leaves 68 of the "Iris" valve 52. It will accordingly be understood that, whereas no air, either hot or cold, is flowing through the mixing chamber in the condition shown in Fig. 7, as the valves are gradually rotated from the zero position of Fig. 7 to the 45° position of Fig. 8 there will be a gradually increasing flow of cold air to the maximum flow at this 45° position, but no hot air flow is permitted up to this angular position of 45°.

As the valves 51 and 52 are continued in their rotation from a 45° position of Fig. 8 toward the 67½° position of Fig. 9, it will be noted that the solid segmental portions 70 of the "Star" valve 51 again start to close the openings in the fixed part 69, thereby restricting the cold air flow through the mixing valve unit. Continued opening of the leaves 68 of the "Iris" valve 52 provides an annular opening outside of the nozzle edge of the cross duct 46 such that, as the cold air flow is now being restricted by the "Star" valve closing, the hot air flow has started just beyond the 45° position and is now increasing toward its full flow. Accordingly, as the two valves are rotated toward their 90° position shown in Fig. 10, the "Star" valve 51 gradually closes thereby slowly cutting off the cold air flow, and the "Iris" valve 52 gradually reaches its full open position such that, at the end of the movement or angle of rotation at the 90° position, the cold air flow again is shut-off completely as the "Star" valve 51 reaches its closed position and the hot air flow reaches its maximum at the full opening of the "Iris" valve 52.

It will be noted that the "Star" valve 51 starts from a closed position at zero degrees in Fig. 7, and half way toward its 90° position reaches the full open position beyond which it is again gradually closed at its 90° position. In other words the cold air "Star" valve in 90° goes from a fully closed, through to a fully open, and then back to a fully closed position. The "Iris" valve on the other hand in going through the same 90° angle of rotation starts from its fully closed position and ends at its fully open position. However, due to the effect of the intermediate nozzle or cross duct 46 the initial opening of the "Iris" valve has no effect upon the hot air flow until its opening exceeds that of the diameter of the nozzle 46. Accordingly, while the hot air "Iris" valve 52 is gradually opening between zero and 45°, at the latter position in Fig. 8, its effect is only to permit the cold air to flow therethrough and the hot air is still shut off at 45°, beyond which it slowly starts to open and reaches its maximum at 90° when the cold air flow has again been completely shut off. It will be noted that as the cold air is gradually cut off, starting to do so as it moves beyond the 45° position, and as the hot air flow only starts at about this same position, the intermediate position shown at 67½° in Fig. 9 is one in which the total flow will be comprised of approximately one half of the cold air flow and one half of the hot air flow.

Assuming that the mixture of the cold and hot air flows, as provided by the mixing valve in the position shown in Fig. 9, is the desired flow and temperature for a given crew compartment condition and the airplane were suddenly subjected to somewhat lower temperatures at which greater or increased heat would be required, this temperature change will be detected by the thermostat 72 and the motor 55 will be actuated to rotate the valve toward the position shown in Fig. 10 in which the cold air flow will be reduced and the hot air flow increased. As the flow and temperature again provide the proper temperature in the crew compartment the thermostat 72 will again operate to shut off the motor 55 until a subsequent change in temperature would again initiate its operation.

It will, of course, be understood that the definite maximum amounts and proportions of the cold and hot air referred to above will depend upon the respective capacities of the hot and cold air sources connected to the mixing valve units, and will also vary to a large extent due to available pressures, temperature of the rammed and blower air sources, resistance of the several ducts, and other factors. It will also be understood that the mixing valve arrangements are not completely dependent upon the specific details of the "Star" and "Iris" valves which have been disclosed, but that the arrangements will operate satisfactorily with other valve means in the desired positions. Also, while the preferred arrangement has been disclosed for use in connection with air, it will be understood that the invention is not limited thereto, but can also be utilized with other fluid, liquids, air and combustible gas mixtures, or in any arrangement in which it is desirable that two fluids be mixed, whether for the mixing thereof or the attainment of a desired temperature level.

Other forms and modifications of the present invention which may occur to those skilled in the art after reading the present description are intended to come within the scope and spirit of the present invention as more particularly set forth in the appended claims.

We claim:

1. In an aircraft, means for mixing hot and cold air quantities comprising a casing forming a hot air plenum having an outlet in a wall thereof, a cold air plenum connected to the casing having an outlet conduit of lesser diameter terminating in the outlet of said hot air plenum, valve means disposed in said hot air outlet, second valve means disposed in said cold air outlet, and operating means for the simultaneous operation of each said valve means such that within a given cycle said hot air outlet valve means is operated from a fully closed to a fully open position, and during said same cycle said cold air valve means is operated from a fully closed, through a fully opened, to a fully closed position.

2. In an aircraft, means for mixing hot and cold air quantities comprising a casing forming a hot air plenum having an outlet in a wall thereof, a cold air plenum connected to the casing having an outlet conduit of lesser diameter terminating within the outlet of said hot air plenum and forming an annular outlet from said hot air plenum, valve means disposed in said annular hot air outlet, second valve means disposed in said cold air outlet and operating means for the simultaneous operation of each said valve means such that within a given range of movement said hot air outlet valve means is operated from a fully closed to a fully open position, and during said same range of movement said cold air valve means is operated from a fully closed, through a fully opened, to a fully closed position.

3. In a heating and ventilating system for aircraft, a cold air plenum, a hot air plenum, a mixing chamber provided to receive controlled flows of hot and cold air from said plenums, outlets from said plenums, the outlet from one plenum constituting a conduit traversing the interior of the other plenum to terminate adjacent its outlet, the said outlets joining in a mixing valve unit to form concentric inlet chambers adapted to direct the flow from one plenum centrally through the unit to said mixing chamber and to direct flow from the other concentrically about the first said flow through an annular space into said mixing chamber and valve elements comprising the operative mechanism of the mixing valve located in the respective inlet chambers and adapted to control the flow therethrough by proportioning the amounts of hot and cold air admitted to the mixing chamber, one of said valve elements being of iris type disposed at a common outlet of the two said inlet chambers adapted to control the flow through both said chambers and another of said valve units being of star type disposed in its respective chamber so as to control only the flow therethrough.

4. In an aircraft, a body portion, an airfoil surface associated therewith requiring a supply of hot air, a ram air inlet, a cold air duct disposed within the body portion having a duct connection extending to the ram air inlet to receive cold fresh air therefrom, a hot air duct spaced in the body portion from said cold air duct, at least one conduit means extending from one duct to the other for conducting air from said cold air duct to said hot air duct, heating means associated with the conduit means adapted to heat the flow of the air through said conduit, connections from said hot air duct to the airfoil surface, a plurality of mixing valve units each including a pair of controllable valves for admixing portions of hot and cold air received from said ducts and an outlet connection from each said mixing valve unit leading to interior portions of the aircraft to supply tempered air thereto.

5. In an aircraft heating system, a fresh air plenum chamber, means for supplying cold fresh air to said plenum chamber, conduit means leading from said plenum chamber, heating means interposed in said conduit means for heating a portion of the air flowing from said chamber, a hot air plenum chamber connected to the terminal end of said conduit for receiving said heated air, an outlet from the hot air plenum chamber, a second outlet from the first said plenum chamber, and mixing means receiving separate flows of hot and cold air through said outlets, including conduits extending from the said outlets to the mixing means, the said conduits being formed to intersect in a common junction wherein one conduit is terminated inside the other, a pair of flow control valves associated with the respective conduits, one of said control valves being located to control the flow through one conduit upstream from the junction point, the other of said valves being located at the junction point to control the flow from the other conduit, the said control valves being of dissimilar type providing different gating patterns whereby they are adapted for mixing desired amounts of said hot and cold air to a preselected temperature.

6. In an aircraft heating system, a fresh air plenum chamber, means for supplying cold fresh air to said plenum chamber, first conduit means leading from said plenum chamber, heating means interposed in said conduit means for heating a portion of the air flowing from said chamber, a hot air plenum chamber connected to the terminal end of said conduit for receiving said heated air, mixing means associated with the said plenum chambers, second conduit means leading from the hot air plenum chamber to the said mixing means adapted to supply thereto a flow of hot air, third conduit means joining the fresh air plenum to the mixing means adapted to supply thereto a flow of cold air, the said second and third conduits being formed to intersect in a common junction wherein one conduit is terminated inside the other, a pair of control valves associated with the respective second and third conduits, one of said control valves being located to control the flow through one conduit upstream from the junction point, the other of said valves being located at the junction point to control the flow through both conduits in sequence, and operating means connected to coordinate the movements of both said valves whereby they are adapted to proportion the flows of hot and cold air flowing into the mixing means to attain a predetermined temperature therein.

7. In an aircraft heating system, a cold air plenum, a hot air plenum, a mixing chamber having an inlet connection from said hot air plenum forming an entrance for receiving flow therefrom, a cold air conduit having one end of lesser cross-section than that of said inlet connection of the hot air plenum extending into and through the hot air plenum to centrally intersect the plane of the said inlet connection thereby providing an entrance for cold air to the mixing chamber concentric to the hot air entrance, the other end of said conduit connecting to the cold air plenum, valve means for controlling the respective flows into said mixing chamber, comprising separate valve units, one being disposed in the cold air conduit adjacent its point of entry to the hot air plenum chamber and adapted to control the flow of cold air, the other being disposed in the plane of the inlet connection and adapted to control the flow of air through both the cold air conduit and the surrounding entrance from the hot air plenum chamber, and an operating interlinkage means between the valve units adapted to permit control of cold air flow by the first valve unit at times when the second valve unit is open.

8. In an aircraft heating system, a cold air plenum, a hot air plenum, a mixing chamber having an inlet connection leading from said hot air plenum forming an entrance for receiving flow therefrom, a cold air conduit having one portion of lesser cross-section than that of said inlet connection extending through the hot air plenum to centrally intersect the plane containing the said inlet connection, thereby providing an entrance for cold air to the mixing chamber concentric to the hot air entrance which is caused thereby to have a generally ring-shaped form, the said conduit having fluid connection to the cold air plenum, valve means for controlling the respective flows into said mixing chamber, comprising separate valve units, one being located in the cold air conduit adjacent its point of entry to the hot air plenum and adapted to control the flow of cold air therethrough, the other being located adjacent the ring-shaped entrance from the hot air plenum and adapted to control the flow of air through both the cold air conduit and the ring-shaped entrance, mechanism for operating said valve means including an operating interlinkage means between the valve units adapted to permit control of cold air flow by the first valve at times when the second valve unit is open, and temperature responsive means for initiating actuation of said mechanism.

9. A mixing and control valve unit comprising a casing having interior partitions defining chambers for reception of separate flows of hot and cold fluids, an outlet from said casing, an interior duct formed by said partitions extending from a first one of said chambers through the interior of the other to terminate adjacent the said outlet, a port providing communication between the second chamber and the outlet, a first valve disposed in said casing adjacent the location of said outlet adapted to control flow through the interior duct and the port in sequence, a second valve in said casing located upstream from the first said valve adapted to control flow from the first chamber into the interior duct, means for controllably operating the valves, operating connections extending between the means and the valves, the said valves being conjointly operated thereby at different timing cycles whereby when said first valve is operating upon the flow through the port, the second valve is operating to control the flow through the duct.

10. In an aircraft heating and ventilating system, an air mixing unit comprising a first air chamber, a second air chamber, an outlet for said second air chamber, a conduit extending from said first air chamber through the second air chamber to terminate in the outlet for said second air chamber, valve means associated with said conduit for controlling the air from said first air chamber, said second air chamber outlet being greater in area than that of the outlet of said conduit to provide an annular space about said conduit for flow from said second chamber through said annular space, second valve means adapted to control the flow through both the said conduit and the said annular space in sequence, and actuating means interlinking the valves for coordinated operation, the said valve being adapted to provide respective operating cycles in which one valve moves from closed to full-open to closed settings and the other moves from full-closed to full-open positions whereby the outlet flow from the mixing unit through the range of valve operation is characterized by an increasing volumetric flow of cold air up to a maximum followed by a mixed flow of hot and cold air variable from the cold air temperature to the maximum hot air temperature.

11. In an aircraft having interior spaces respectively requiring supplies of hot air and tempered air, means for obtaining a suply of ambient air, means for drawing-off and heating a portion of this supply, a hot air plenum connected to the said means to receive the heated air portion, means for drawing-off a second portion of the air supply, a second plenum connected to said second means to receive the second air supply portion, a mixing chamber, conduits leading from each plenum, the said conduits being joined at a control point and continued as a single duct to terminate in the said mixing chamber, valve means comprising separate valve units respectively installed in the conduits at the control point, the said valve means being adapted to provide control of the flows through the conduits from the respective plenums, operating means adapted to provide coordinated control of the separate flows through the conduits past the control point by actuating the separate valve units such that within a given range of movement, one valve unit will be operated from a fully closed to a fully opened position while the other valve unit is operated from a fully closed, through fully opened, to a fully closed position whereby a tempered supply of mixed heated and ambient air is provided in the mixing chamber, a duct leading from the mixing chamber to the space requiring tempered air, and a second duct leading from the hot air plenum to the space requiring hot air.

12. Apparatus for mixing hot and cold air quantities comprising a casing forming respective hot and cold air plenums, an opening formed in the wall of one of said plenums, an outlet conduit extending from the other of said plenums to terminate at the plane of said opening, the said outlet conduit having its terminal end of a lesser cross-sectional area than said opening and forming therewith a generally ring-shaped outlet from the one said plenum, valve means disposed at said opening adapted to control flow therethrough, second valve means disposed in said outlet conduit to control the flow therethrough, operating means for the simultaneous operation of each said valve means such that in the valve operating cycle as the valve controlling the flow through the said opening is operated from a fully closed to a fully opened position, the second valve means will be operated from a fully closed, through a fully opened, to a fully closed position.

13. In a heating and ventilating system or aircraft, a cold air plenum, a hot air plenum, air flow connections leading from said plenums and constituting air outlets therefrom, a mixing chamber adapted to receive flows of hot and cold air from said plenums by way of said connections, the said air flow connections forming an assembly of concentric inlet chambers leading to the mixing chamber and adapted to direct the flow from one plenum centrally through the inlet chamber assembly into said mixing chamber and to direct the flow from the other concentrically about the first said flow through an annular space constituting one of said inlet chambers into said mixing chamber, valve elements disposed in operative association with the inlet chambers adapted to control the individual air flows therethrough, the said valve elements comprising respectively a star valve located to control the flow through the central inlet chamber and an iris valve located to control the flow from the other inlet chamber into the mixing chamber, the said valves having different operating cycle characteristics such that the star valve has a time cycle for closed to open positions which is different from the equivalent time cycle of the iris valve, and power means for simultaneously operating said valve elements to thereby variably proportion the amount of hot and cold air admitted to the mixing chamber.

References Cited in the file of this patent

UNITED STATES PATENTS

| | | |
|---|---|---|
| 1,783,005 | Stewart | Nov. 25, 1930 |
| 2,131,725 | Chester | Oct. 4, 1938 |
| 2,310,941 | Dewey | Feb. 16, 1943 |
| 2,370,035 | Heymann | Feb. 20, 1945 |
| 2,391,838 | Kleinhans | Dec. 25, 1945 |
| 2,412,110 | Williams | Dec. 3, 1946 |
| 2,443,071 | Honerkamp et al. | June 8, 1948 |

FOREIGN PATENTS

| | | |
|---|---|---|
| 297,955 | Italy | Mar. 25, 1930 |
| 341,460 | Great Britain | Jan. 16, 1931 |
| 870,810 | France | Dec. 22, 1941 |